C. E. KENNARD.
Machine for Molding Heel-Stiffeners for Boots & Shoes.

No. 227,113. Patented May 4, 1880.

Witnesses:
Stephen Moore
Homer Rogers

Inventor:
Chas. E. Kennard

UNITED STATES PATENT OFFICE.

CHARLES E. KENNARD, OF BOSTON, MASSACHUSETTS, ASSIGNOR TO MOUSAM MANUFACTURING COMPANY, OF KENNEBUNK, MAINE.

MACHINE FOR MOLDING HEEL-STIFFENERS FOR BOOTS AND SHOES.

SPECIFICATION forming part of Letters Patent No. 227,113, dated May 4, 1880.

Application filed January 26, 1880.

*To all whom it may concern:*

Be it known that I, CHARLES E. KENNARD, of Boston, in the county of Suffolk and State of Massachusetts, have invented a new and useful Machine for Molding Heel-Stiffenings for Boots and Shoes, of which the following is a specification.

The invention relates to that class of machines in which the stiffening is set to shape by being pressed between a reciprocating die or former and a female mold conforming to the operating-surface of the former; and it consists in the combination of a female mold adapted to be reciprocated about a central axis, with which its operating-surface is concentric, with a former adapted to not only be moved toward and away from such mold, but also to remain at rest when in a position in which its operating-surface is concentric with said mold, while the mold is reciprocated upon its axis independently of any motion of the former, the operation of the parts being adapted to repeatedly rub all portions of one side of the interposed stiffening in two directions, and thus cause it to retain the shape it is forced to assume between the former and mold much more permanently than would be the case were it simply pressed without being repeatedly rubbed.

Figure 1:
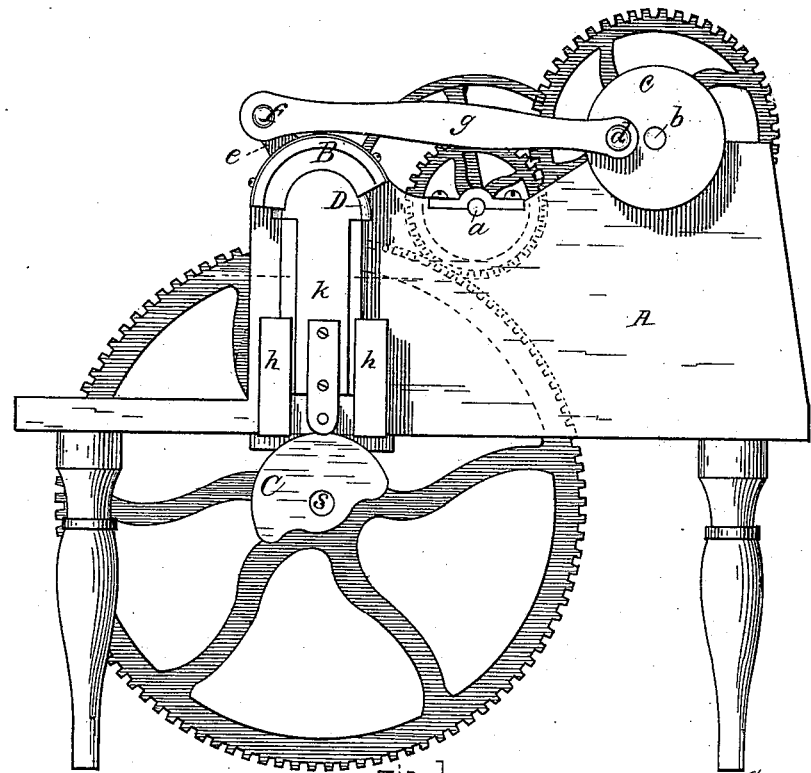
Figure 2:
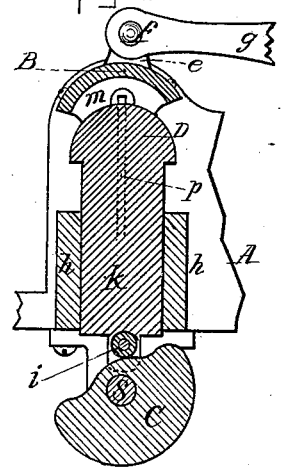
Figure 3:
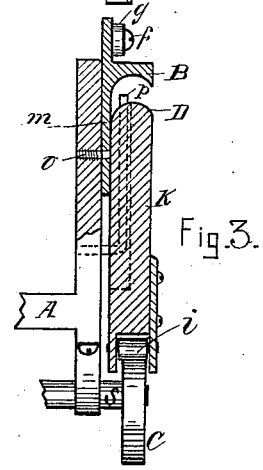

In the accompanying drawings, in which similar letters of reference indicate like parts, Figure 1 is a side elevation of a machine embodying my invention; Fig. 2, a longitudinal section of the mold and former, and Fig. 3 a vertical cross-section of the same.

Upon a suitable frame, A, is mounted a shaft, $a$, adapted to be revolved by any suitable means, and connected by gearing with another shaft, $b$, upon which is fastened the face-plate $c$, carrying the wrist-pin $d$, as plainly shown in Fig. 1.

B is a female mold adapted to be reciprocated about a fixed axis, $o$, attached to the main frame A. This mold has its concavity of the shape to which it is desired to mold the stiffening so far as may be and have all parts of its operating-surface concentric with the axis about which it is movable. It is made to project from a vertical plate, $m$, which is pivoted to the main frame at $o$, Fig. 3, such pivotal point being so placed that the working-surface of the mold is concentric therewith. An arm, $e$, projecting outward from the mold, carries a stud, $f$, upon which is pivoted one end of the connecting-rod $g$, the other end of which is carried by the wrist-pin $d$ above mentioned.

It will be readily seen that by the revolution of the shaft $b$ the mold B is, through the connecting-rod $g$, caused to reciprocate upon its axis $o$. A shaft, $s$, mounted in bearings attached to the main frame A, and connected by gearing to the driving-shaft $a$, carries a cam-wheel, C, as shown in Fig. 1. This cam-wheel operates to drive, through the roll $i$, Fig. 2, the slide $k$, working in ways $h$ $h$, and upon which is mounted the former D. This former is shaped so as to conform substantially to the concave surface of the mold B, and may have its surface roughened to prevent the slipping of the stiffening upon it. The cam-wheel C is of such a shape as will impart to the former an intermittent reciprocating motion. When elevated to the position shown in Fig. 1 it (the former) remains stationary during about one-half an entire revolution of the shaft $s$ and cam-wheel C, and when by the revolution of the cam allowed to drop to the position shown in Fig. 2 it remains stationary at that point for about one-fourth of a revolution of the cam.

The gearing connecting the shafts $s$ and $b$ with the driving-shaft $a$ is so arranged as to revolve the shaft $b$ several times faster than the shaft $s$. Passing downward through the former, and thence bent at an angle and attached to the frame A, is a rod, $p$, Fig. 3, in such a position that when the former is at its lowest point the rod projects above it, but as the former rises the rod is covered by it. The office of this rod is to loosen the stiffening from the former after it has, by the action of the mold, been firmly shaped thereto.

In the operation of the machine, the driving-shaft $a$ being revolved, and the former D being in the position shown in Fig. 2, a flat stiffening is placed upon it, and by the revolution of the cam C the former is raised nearly to the mold, to the position shown in Fig. 1, compressing the stiffening and forcing it to assume the shape of the former, and at the same time, by the reciprocation of the mold, it is rubbed so as to become permanently set in its new form.

By the continued revolution of the cam the former is allowed to drop to the position shown in Fig. 2, and the rod $p$, projecting through its upper surface, loosens the stiffening, so that it may readily be removed and another substituted.

If it be desired to rub the inside of the stiffening instead of the outside, the mold may be roughened and the former made smooth, when the stiffening will be carried with the mold, and the rubbing will take place between the stiffening and the former.

I do not claim the mechanism described in United States Patent No. 192,341, dated June 26, 1877, as such mechanism is only adapted to rub each portion of the outer surface of stiffening once in a single direction, while one peculiarity of my improvement is, that the rubbing may take place upon the outer or inner surface of the stiffening, and may be continued as long as may be desired by graduating the speed of the shaft $b$ as compared with that of the shaft $s$.

What I claim is—

1. In a machine for molding heel-stiffeners, the combination of a female mold adapted to be reciprocated about a central axis, with which its operating-surface is concentric, with a former adapted to not only be moved toward and away from such mold, but also to remain at rest when in a position in which its operating-surface is concentric with said mold, while the mold is reciprocated upon its axis independently of any motion of the former, the operation of the parts being adapted to repeatedly rub all portions of one side of an interposed stiffening in two directions, as shown and described.

2. In combination with the mold B, adapted to be reciprocated about a central axis, the former D, slide $k$, cam C, and shaft $s$, arranged and to operate substantially as set forth.

3. In combination with the former D, adapted to be intermittently reciprocated, as shown, the mold B, mounted upon the axis $o$, the connecting-rod $g$, wrist-pin $d$, face-plate $c$, and shaft $b$, as herein described.

4. The former D, the slide $k$, cam C, and shaft $s$, in combination with the mold B, mounted on the axis $o$, and operated through the connecting-rod $g$, wrist-pin $d$, face-plate $c$, and shaft $b$, as herein specified.

CHARLES E. KENNARD.

Witnesses:
 STEPHEN MOORE,
 HOMER ROGERS.